United States Patent [19]
Diamant et al.

[11] Patent Number: 5,969,632
[45] Date of Patent: Oct. 19, 1999

[54] INFORMATION SECURITY METHOD AND APPARATUS

[76] Inventors: Erez Diamant, 101 Nordau St., Herzelia; Amir Prescher, 11 Slomzion St., Ramat Gan, both of Israel

[21] Appl. No.: 08/754,871

[22] Filed: Nov. 22, 1996

[51] Int. Cl.$^6$ .................................................. G06F 12/14
[52] U.S. Cl. ...................................... 340/825.32; 713/201
[58] Field of Search ........................... 340/825.32, 825.31, 340/825.34; 395/186, 187.01, 700; 380/49, 25; 713/200, 201; 711/163; 708/135; 709/229

[56] References Cited

U.S. PATENT DOCUMENTS

| | | |
|---|---|---|
| 4,975,950 | 12/1990 | Lentz . |
| 5,144,659 | 9/1992 | Jones . |
| 5,144,660 | 9/1992 | Rose . |
| 5,202,997 | 4/1993 | Arato . |
| 5,268,960 | 12/1993 | Hung et al. . |
| 5,289,540 | 2/1994 | Jones . |
| 5,317,746 | 5/1994 | Watanabe ................................. 395/700 |
| 5,343,525 | 8/1994 | Hung et al. . |
| 5,361,359 | 11/1994 | Tajalli et al. ............................. 395/700 |
| 5,414,844 | 5/1995 | Wang . |
| 5,434,562 | 7/1995 | Reardon . |
| 5,475,839 | 12/1995 | Watson et al. . |
| 5,499,334 | 3/1996 | Staab . |
| 5,509,120 | 4/1996 | Merkin et al. . |
| 5,530,455 | 6/1996 | Gillick et al. . |
| 5,559,883 | 9/1996 | Williams . |
| 5,564,002 | 10/1996 | Brown . |

*Primary Examiner*—Edwin C. Holloway, III

[57] ABSTRACT

Communication apparatus including a public network, a secured network, a plurality of public nodes connected to the public network and a plurality of secured nodes connected to the secured network and to the public network. The nodes including interfaces for communicating therebetween over the networks, wherein each the secured node includes a communication controller a computer system and a secured storage area. A secured node divides a confidential message into at least two segments and transmits the segments via the networks wherein at least a selected one of the segments is transmitted via at least one of the secured networks. The communication controller is also operative to disconnect the secured storage area from the computer station and the public network when the communication between the computer station and the public network is in progress.

11 Claims, 12 Drawing Sheets

INFORMATION SECURITY METHOD AND APPARATUS

FIELD OF THE INVENTION

The present invention relates to methods and systems for securing information during communication.

BACKGROUND OF THE INVENTION

Method for securing information are known in art. Conventional methods are based on encryption wherein secured data is processed according to a predetermined encryption method or key to provide an encrypted file. Decoding the encrypted file, back to the original information requires processing the encrypted file backwards according to the encryption method or key.

Computers which are connected to WAN or LAN communication networks are vulnerable to hostile intrusion by unauthorized persons or data viruses which attempt to access classified files, download them and "crack" their encryption.

The problem is significantly enhanced for portable computers. which are also liable to be stolen along with the information contained therein.

Another major problem relates to securing access to data and devices when in communication over a network. Unauthorized network users may attempt to penetrate the secured system or try to send damaging software, such as software viruses. Prior art software systems such as fire-walls and the like, do not provide a full proof solution against such unauthorized attempts.

Another major problem relates to securing an organization's networks and computers against virus programs. A number of products currently provide on-line scanning of incoming communication to identify damaging software such as viruses (such as WebShield of Finjan Software Ltd. of Netania, Israel, PCFireWall and WebScan of McCafee Inc. of Santa Clara Calif.). It will be appreciated that scannning all incoming data and data changes during communication consumes a great deal of resources and is generally not performed at a full scale in real time.

It will be appreciated that scanning all incoming data and data changes during communication consumes a great deal of resources and is generally not performed at a full scale in real time.

U.S. Pat. No. 5,434,562 to David C. Reardon describes a manually user operable switch for securing a device such as a hard disk from unauthorized access from a network.

In computer systems, it is common to implement an audit log, to record security related activities in the system. In this case, the recorded log itself needs to be secured against future alteration, which will deceive the auditor to trust a forged record.

It will be appreciated that an effective security log needs to be written on a media which cannot be altered. A common method is to print the log on hard copy. While hard copy is difficult to alter, it is also more difficult to duplicate, process and communicate in a computerized environment.

Another method is to write the log on a Write Once Read Many media (such as Pinnacle RCD-1000, Pinnacle Micro Corporation). It will be appreciated that in practice Write Once Read Many data storage solutions are inferior to common read-write technologies (such as magnetic hard disks) in both performance and reliability. Furthermore, the installation of a Write Once device for the sole purpose of recording a log involves significant costs.

SUMMARY OF THE PRESENT INVENTION

It is an object of the present invention to provide a novel device for providing information security over a communication network, which overcomes the disadvantages of the prior art.

It is a further object of the present invention to provide a novel method for securing information contained in a personal computer.

There is thus provided in accordance with the present invention a device for protecting secured areas in a computer system, the device including:

a communication interface for connecting to a network, a secured device interface for connecting to a secured area, a managing controller connected to the communication interface and between the secured device interface and the computer station. wherein the managing controller detects when the communication is between the computer system and the network is in progress. The managing controller connects the computer system with the secured device interface when communication is not in progress. The managing controller disconnects the computer station from the secured device interface when communication is in progress.

The secured device interface is selected from the group consisting of:

a communication interface, an input-output data interface, a human interface and an electromechanical device interface.

According to one aspect of the invention the secured device interface includes a modem.

According to another aspect of the invention the secured device interface includes an input-output data interface and wherein the device further includes a storage unit connected to the input-output data interface, wherein the storage unit storing secured information.

The storage unit is selected from the group consisting of:

a random access memory, a read only memory, a hard disk drive, an EPROM, an EEPROM, a FLASH memory unit, an optical storage unit and an electro-optical storage unit.

The device of the invention may also include a first wireless transceiver connected to the managing controller and a remote unit. The remote unit includes a transceiver and a processor, connected thereto, the processor controlling the second transceiver. The first transceiver is operative to enable the managing controller to connect the computer station with the secured area interface when detecting a predetermined transmission. The remote unit is operative to transmit this predetermined signal via the second transceiver.

There is also provided, in accordance with the present invention a method for protecting a secured area in a computer system which is connected to a network, wherein the computer system includes a secured area. The method including the steps of:

A. detecting the communication status between the computer system and the network, if the communication status is on-line, proceeding to step B, otherwise enabling access to the secured area;

B. monitoring all incoming data access requests and detecting if access is requested to the secured area, if so, proceeding to step C, otherwise proceeding to step D;

C. executing an alert procedure;

D. detecting the communication status between the computer system and the network, if on-line, proceeding back to step B, otherwise proceeding to step E; and E. proceeding back to step A.

The alert procedure is selected from the group consisting of:

denying access to the secured area;

providing an alert signal to a user operating the computer system; and providing access to an alternative area.

According to alternative aspect of the invention, there is provided a method for protecting a secured area in a computer system which is connected to a network, wherein the computer system includes a secured area and a public storage area. The method including the steps of:

A. detecting the communication status between the computer system and the network, if on-line, proceeding to step B, otherwise enabling access to the secured area, B. monitoring all incoming data access requests and detecting if access is requested to the secured area, if so, proceeding to step C, otherwise proceeding to step D, C. executing an alert procedure, D. detecting the communication status between the computer system and the network, if on-line, proceeding back to step B, otherwise proceeding to step E, E. analyzing data contained in the storage area so as to detect harmful software therein, if such harmful software is detected, proceeding to step F, otherwise enabling access to the secured area and proceeding to step A, and F. executing an alert software.

According to another aspect of the invention step B further includes generating at least one log entry representing the access request before proceeding to step D, and the analyzing, in step E, is performed according to the at least one log entry.

According to the invention, there is also provided a method for controlling a server which is connected to at least one public network, at least one secured network and a storage unit. The storage unit includes a public storage area and a secured storage area. The method includes the steps of:

A. receiving a transmission,

B. determining the type of request contained in the transmission whereby if the transmission contains a write access request then proceeding to step C and if the transmission contains a read access request, then proceeding to step H, C. determining if at least a portion of the transmission was received via the secured network whereby if so, then proceeding to step D, otherwise, proceeding to step E, D. determining a storing mode for storing the transmission, E. determining if the requested destination of the transmission is the secured area, whereby if so, then proceeding to step G, otherwise proceeding to step F, F. storing the the transmission in the public storage area, G. executing an alert procedure, H. determining if at least a portion of the transmission was received via the secured network whereby if so, then proceeding to step I, otherwise proceeding to step J, I. retrieving data, according to the access request, J. determining if the requested destination of the transmission is the secured area whereby if so, then proceeding to step E, otherwise proceeding to step K, and K. retrieving data, from the public storage area, according to the access request.

According to the invention the storing mode is selected from the group consisting of:

(1) dividing the transmission into at least two segments and storing the segments in the storage unit whereby at least one of the segments is stored in the secured storage area and at least another of the segments is stored in the public storage area, (2) storing the transmission as a single file in the secured storage area, and (3) dividing the transmission into at least two segments and storing the segments at various locations in the secured storage area.

The invention also provides a novel method for managing a log file including the steps of:

A. receiving a command,

B, if the command is a write-command then, proceeding to step C, otherwise, if the command is a read-command, retrieving a log entry according to the command and proceeding to step A, C, retrieving log information from the command and proceeding to step D, D, providing a log address to the log information, the log address being in sequence with a previously written log address and proceeding to step E, and E. writing the log information at the log address and proceeding to step A.

In accordance with a further aspect of the present invention there is thus provided a novel server for a communication network system including at least one public network and at least one secured network. The server includes:

at least one storage unit, wherein at least one of the at least one storage units includes a secured storage area;

at least one communication interface for connecting to the networks, at least one input-output interface for connecting to the at least one storage units, a central processing unit (CPU) and a communication controller connected to the at least one storage unit via the at least one input-output interfaces, the networks via the at least one communication interface and to the CPU, for providing access to the secured storage area when at least a portion of an access request is received from at least one of the at least one secured network.

In accordance with yet another aspect of the present invention there is provided a communication apparatus including:

a public network, a secured network, a plurality of public nodes connected to the public network, a plurality of secured nodes connected to the secured network and to the public network, the nodes including means for communicating therebetween over the networks, wherein each the secured node includes a communication controller for dividing a confidential message into at least two segments and transmitting the segments via the networks wherein at least a selected one of the segments is transmitted via at least one of the secured networks.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention includes several aspects which define novel principles for transmitting and storing data in a multiple computer system.

According to one aspect of the invention, secured areas and public areas are physically separated. Thus, a network system according to the invention shall include at least two communication networks wherein at least one of these networks is defined as a secured network, whereby confidential information is generally transmitted via the secured area. There is no direct connection between the public network and the secured network.

According to another aspect of the invention, confidential transmissions are physically divided into at least two elements wherein at least a predetermined one of them is required to reconstruct the original transmission. This predetermined element is transmitted via a secured network and stored in a secured storage area, both of which can be physically disconnected from a main channel of communication.

According to a first implementation of the invention, the first element includes a portion of the classified data and the second element includes a complementary element of the classified data.

According to a second implementation of the invention, the first element includes the classified data in an encrypted form and the second element includes the encryption-decryption software.

According to a third implementation of the invention, the first element includes the classified data in an encrypted form and the second element includes the encryption-decryption key.

Figure 1:
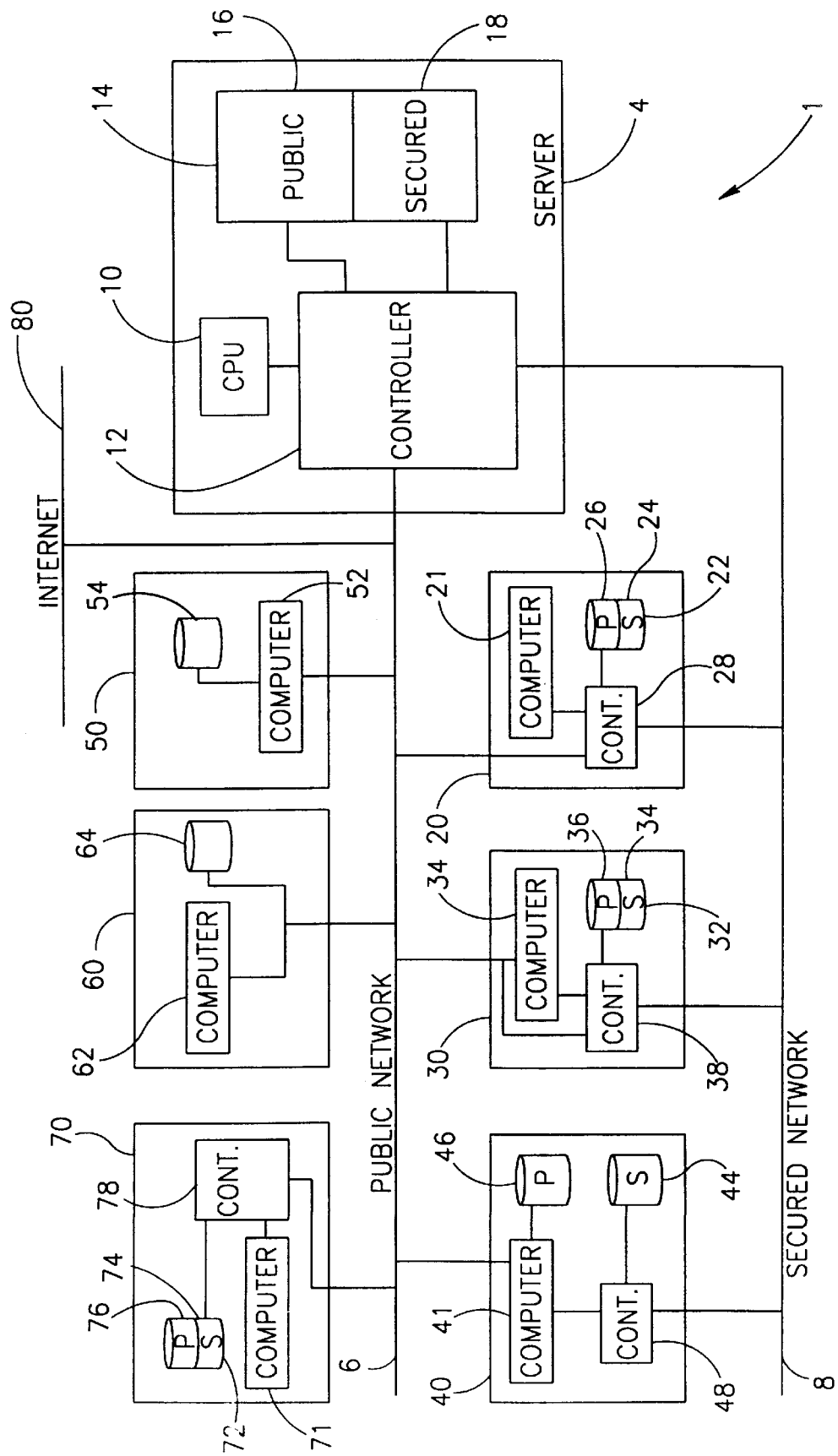
FIG. 1 is a schematic illustration of a network providing secured information communication, constructed and operative in accordance with a preferred embodiment of the invention.

Reference is now made to FIG. 1 which is a schematic illustration of a network providing secured information communication, generally referenced 1, constructed and operative in accordance with a preferred embodiment of the invention.

Network 1 includes a plurality of nodes, referenced 20, 30, 40, 50, and 60, a server 4, a public network 6 and a secured network 8. All of the nodes 20, 30, 40, 50, 60 and 70 are interconnected via public network 6.

According to the present example, nodes 20, 30, 40 and 60 are also interconnected via secured network 8. The public network 6 is also connected to an external network which in the present example is the Internet 80.

Server 4 includes a Central Processing Unit 10 (CPU), a storage unit 14 and a controller 12. The controller 12 is adapted to receive transmissions from networks 6 and 8 and write them in various locations in the storage unit 14. The storage unit is divided into at least two areas, a public area 16 and a secured area 18. The public area 16 contains non-confidential information whereas the secured area 18 contains classified information.

Node 20 is a secured node which is able to transmit and receive confidential information over the networks 6 and 8. The node 20 includes a computer station 21, a storage unit 22 and a communication controller 28. Communication controller 28 is connected to the computer station 21, the storage unit 22, the public network 6 and the secured network 8. The storage unit 22 is divided into two storage areas, a public storage area 26 and a secured storage area 24.

The communication controller 28 controls all communication to and from node 20. The communication controller 28 provides access to the public storage area 26 to both networks 6 and 8. The communication controller 28 provides, only the secured network 8 with access to the secures storage area 24.

At node 20, all of the communication with the public network 6 goes through the communication controller 28. Thus, the communication controller 28 monitors and controls all communications between the computer 21 and the public network 6.

Node 30 is a secured node which is able to transmit and receive confidential information over the networks. The node 30 includes a computer station 31, a storage unit 32 and a communication controller 38. Communication controller 38 is connected to the computer station 31, the storage unit 32, the public network 6 and the secured network 8. The computer 31 is also connected to the public network 6. The storage unit 32 is divided into two storage areas, a public storage area 36 and a secured storage area 34.

The communication controller 38 monitors all of the communication transmissions received from the public network so as to detect access attempts to the secured storage area 34. When such an attempt is detected, the communication controller denies access to the secured area 34 and executes an alert procedure to alert the user of the node 30.

Node 40 is a secured node which is able to transmit and receive confidential information over the networks 6 and 8. The node 40 includes a computer station 41, a public storage unit 46, a secured storage unit 44 and a communication controller 48. Communication controller 48 is connected to the computer station 41, the secured storage unit 44, and the secured network 8. The computer 41 is also connected to the public network 6 and to the public storage unit 46.

The communication controller 48 provides access to the secured storage unit 44. The public network 6 has access to the public storage area 46 via the computer 41.

Node 50 is a non-secured node having a storage unit 54 and a computer 52, connected thereto and to the public network 6. Node 60 is a non-secured node having a storage unit 64 and a computer 62. Both the storage unit 64 and a computer 62 are interconnected as well as connected to the pubic network 6.

It will be noted that nodes 50 and 60 are connected to the public network 6 only and thus are not authorized to access any confidential information which is stored on any of the secured storage areas 34, 44, 24 and 18.

Node 70 is a locally secured node having a computer 71, a storage unit 72 and communication controller 78. The storage unit 72 is divided into two storage areas, a public storage area 76 and a secured storage area 74.

The communication controller 78 is connected to the storage unit 72, the public network 6 and to the computer 71. The computer 71 is connected to the public network 6. When the communication controller 78 detects that the computer 71 is in communication with the network 6, it denies any access to the secured storage area 74.

According to the invention, each of the communication controllers 18, 28, 38, 48 and 78 monitors all of the communication transmissions received from the public network 6 so as to detect access attempts to a respective secured storage area connected thereto. When such an attempt is detected, the respective communication controller denies access to the relevant secured area and executes an alert procedure to alert any user using the node or server.

According to the present invention, all of the above three implementations for determining the first and second segments are available for the present example, wherein the first segment is stored in a public storage area of the receiving node and the second segment is stored in a secured storage area of the receiving node. It is noted that for such matters, a server can be considered a node.

According to the invention, non-confidential data from any node to any node can be transmitted over the public network 6 and stored in a public storage area of the receiving node. Confidential information can be transmitted over the public network 6, divided into a first and second segments and stored accordingly wherein the first segment is stored in the public storage area of the receiving node and the second segment is stored in the secured storage area of the receiving node.

For example, retrieving confidential information from the server 4 is performed by transmitting a retrieval request divided into two segments where the first segment is transmitted over the main network 6 and to the destination node and the second segment is transmitted to the destination node over the secured network 8. Hence, only nodes which are connected to the secured network 8 receive the two segments which are required to reconstruct the classified information.

Thus, a request for altering data stored in the secured area 18 will only be performed if received, at least partially, via the secured network 8.

Dividing a file into segments can be performed according to numerous ways such as generating the first segment from all of the odd bits in the original file and generating the second segment from all even bits in that original file, splitting the file in half, splitting the file into a predetermined large number of segments, and the like.

According to one aspect of the invention, the public network 6 and the secured network 8 are both implemented on the same communication medium, in different ways. For example, the public network 6 is represented by a modulated transmission in a first predetermined frequency and the secured network 8 is represented by a modulated transmission in a second predetermined frequency. Furthermore, any of communication networks 6 and 8 may consist of cable communication, wireless communication, optical communication and the like.

According to the present example, communication of confidential information between two nodes can be performed only between nodes which are connected via the secured network 8. For example, when node 40 needs to transfer confidential information to node 20, the confidential information is divided into two elements. The two elements are transmitted from node 40 to node 20 wherein the first element is transmitted over the public network 6 and the second element is transmitted over the secured network 8.

Figure 2:
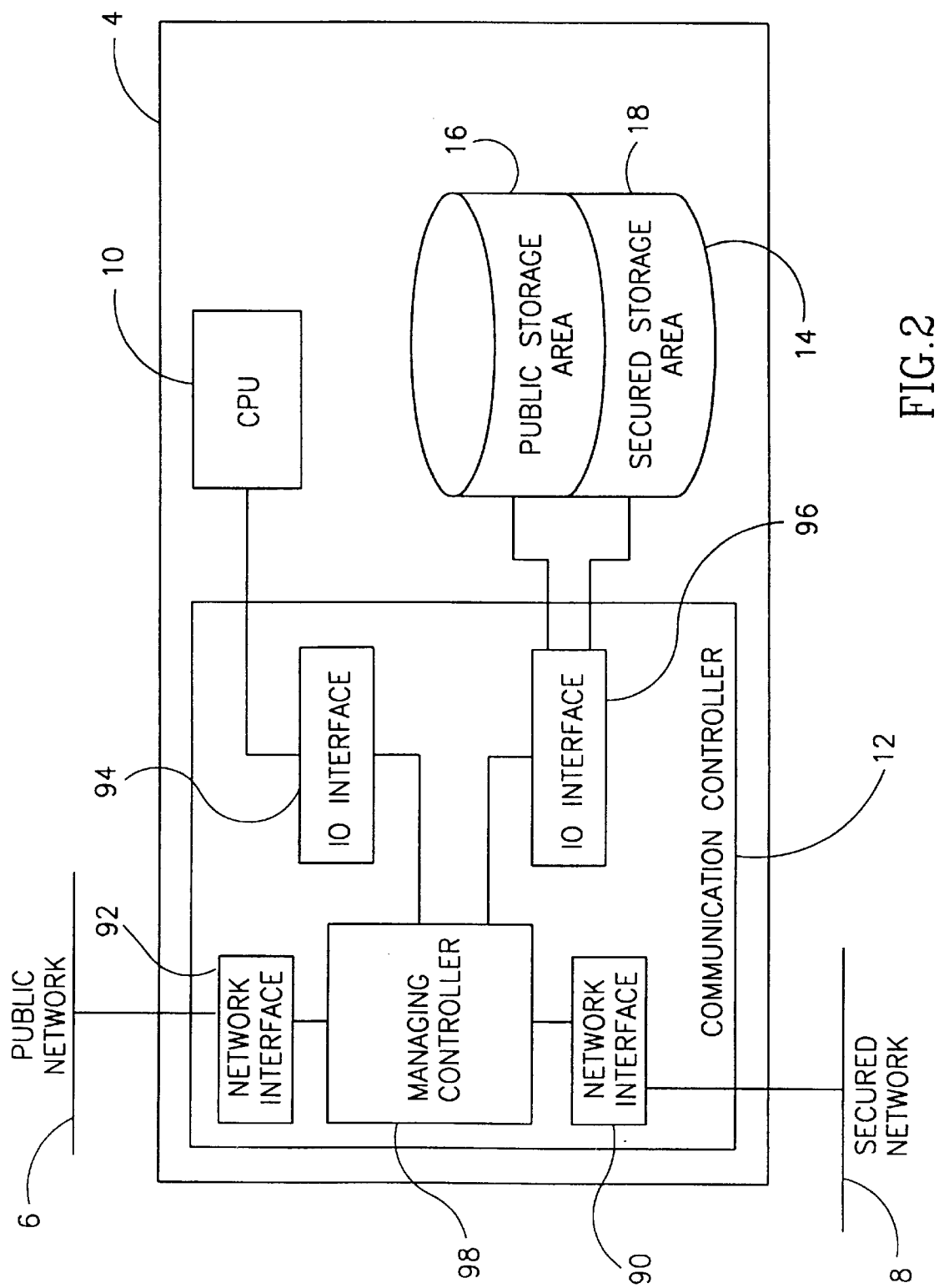
FIG. 2 is a schematic illustration in detail of the server of FIG. 1 and the communication controller, according to the invention.

Reference is now made to FIG. 2 which is a schematic illustration in detail of server 4 of FIG. 1 and the communication controller 12 according to the invention.

The communication controller 12 includes a network interface 92, connected to the public network 6, a network interface 90 connected to the secured network 8, an input/output (I/O) interface 96 connected to the storage unit 14, an I/O interface 94 connected to the CPU 10 and a managing controller 98. The managing controller 98 is also connected to the network interface 92, the network interface 90, the I/O interface 96 is and the I/O interface 94.

The managing controller 98 provides access to the secured storage area 18 only to access requests which are provided via the secured network 8.

According to the invention, an access request may include several data segments wherein some of these segments are received from the public network 6 and the rest are received from the secured network 8.

The managing controller 98 combines these data segments back to form the original access request and executes it.

Thus, information can be stored in the secured storage area 18 in two cases, either if at least partially received from the secured network 8 or if originally determined as confidential information by one of the computers 20, 30 and 40, connected to the secured network 8. It will be appreciated that security is enhanced when all of the secured information is transmitted over the secured network 8.

According to the invention, a confidential information file arrives at the server 4 divided into at least two segments. This confidential information file can be stored either in the secured storage area 18 or both in the secured storage area 18 and the public information storage area 16, according to several storing and retrieving modes.

According to one storing mode, the managing controller 98 receives the confidential information file divided into several segments. The managing controller 98 then stores some of these segments in the secured storage area 18 and the rest of the segments in the public storage area 16.

According to another storing mode, the managing controller 98 combines all of the segments to form a single file and stores it in the secured information storage area 18.

According to a further storing mode, the managing controller 98 stores the confidential information file in the secured storage area in a segmented form. According to this mode, when requested to retrieve this information from the storage unit 14, the managing controller 98 accesses the segments which form the confidential information file and transmits them without any processing, reassembling and the like.

According to another aspect of the invention, the server 4 reassembles the original file of the confidential information from segments of the classified information and stores it as one file in the secured information storage area 18.

Figure 3:
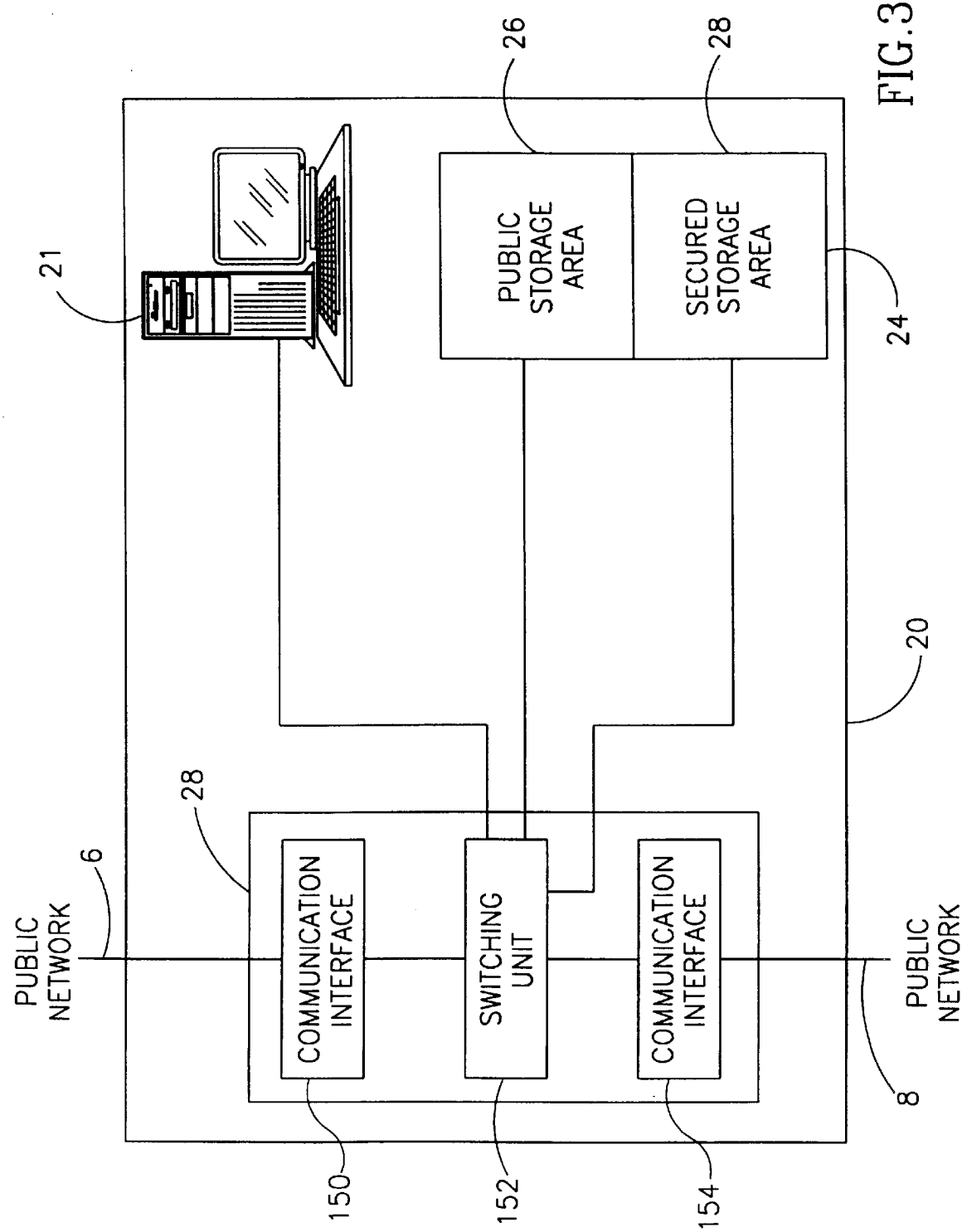
FIG. 3 is a schematic illustration in detail of a node, shown in FIG. 1 and a communication controller therefor, according to the invention.

Reference is now made to FIG. 3 which is a schematic illustration in detail of node 20 of FIG. 1 and the communication controller 28 according to the invention.

The communication controller includes a communication interface 150 for connecting to the public network 6, a communication interface 154 for connecting to the secured network 8 and a switching unit 152 for directing data inside the node 40. Communication of node 20 to any of the two networks 6 and 8 must be performed via the communication controller 28.

Figure 4:
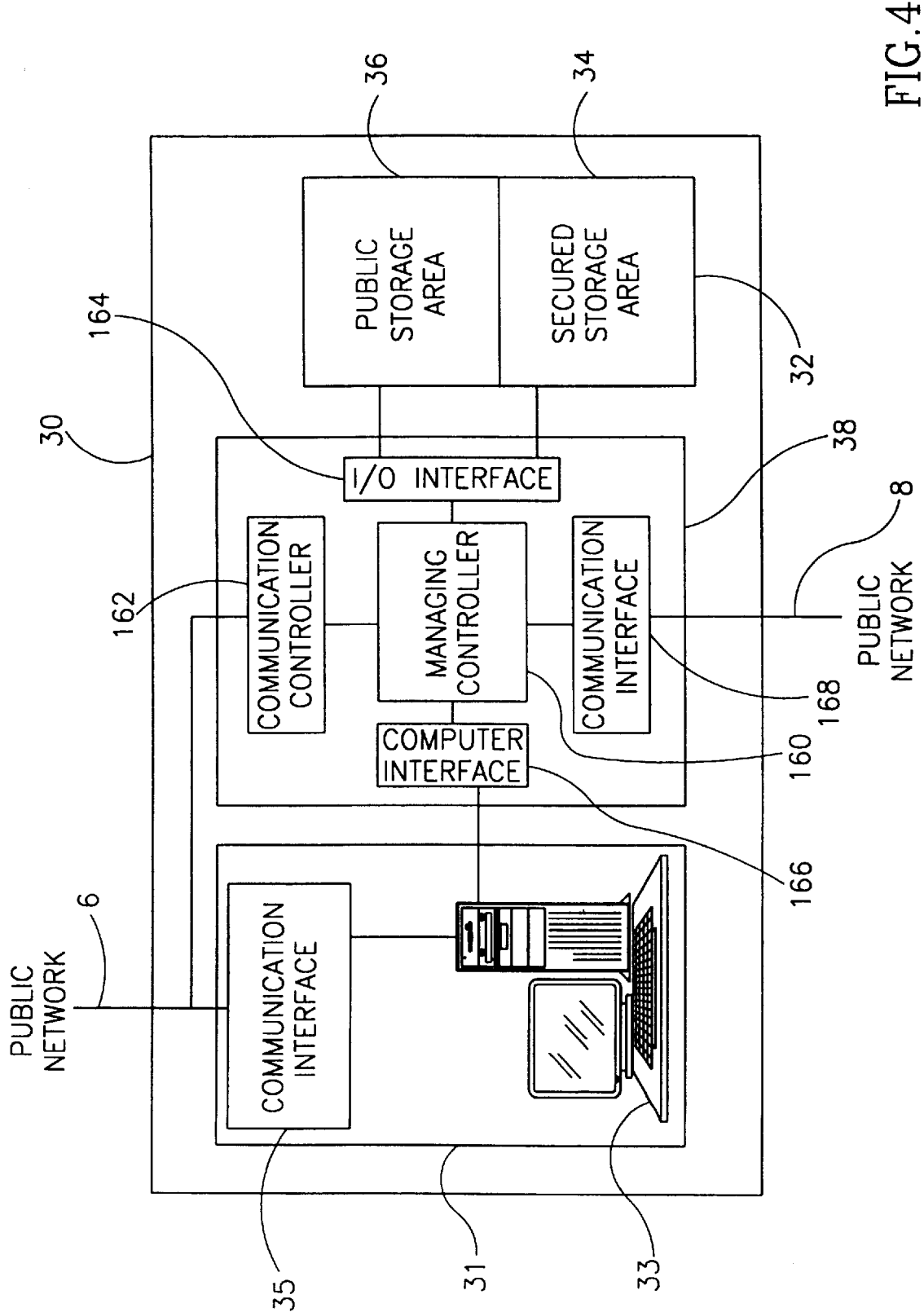
FIG. 4 is a schematic illustration in detail of another node shown in FIG. 1.

Reference is now made to FIG. 4 which is a schematic illustration in detail of node 30 of FIG. 1.

The computer 31 includes a working station 33 and a communication interface 35, connected thereto. The communication controller 38 includes a communication detector 162, a managing controller 160, a computer interface 166, an I/O interface 164 and a communication interface 168.

The communication detector 162 is connected to the managing controller 160 and to the public network 6 for detecting communications received by computer 31. The computer interface 166 is connected to the managing controller 160 and to the computer 31. The I/O interface is connected to the managing controller 160 and to the storage unit 32.

The communication interface 168 is connected to the managing controller 160 and to the secured network 6.

Communication interface 168 is a conventional WAN or LAN interface, such as a modem or an Ethernet interface. According to the present example, the computer 31 can communicate over the public network 6 directly via the communication interface 35.

The computer 31 receives access requests from public network 6 via the communication interface 35. The computer 35 provides these requests to the managing controller 160 via the computer interface 166. The managing controller 160 retrieves the information from the public storage unit 36 and provides it to the computer 31 which, in turn, transmits it to the public network 6 via the communication interface 35.

The managing controller 160 also detects access requests directly from the public network 6 and processes them. If the managing controller 160 detects an information request which relates to information stored in the secured storage area 34, a corresponding request for this information provided by the computer 31 will be denied.

It is noted that non-restricted communication between the public network 6 and the non-secured areas of node 30, such as the computer 31 and the public storage area 36, is provided directly via the communication interface 35 and as such is not interrupted by the communication controller 38.

The communication controller 38 also provides a full separation security mode. According to this mode, when the communication detector 162 detects that the computer 31 is communicating with the public network 6, it physically disables the I\O interface 164 and the communication interface 168, thus eliminating any access to the secured storage area 34 and to the secured network 8.

Referring back to FIG. 1, there is provided a further aspect of the present invention, in which node 40 is defined as a security supervising station. Thus, when a secured node such as node 20 wants to transmit data from the secured storage area 24 to a non-secured node, for example to node 50, node 20 transmits this data to node 40. Node 40, receiving this data, stores it in the secured storage unit 44 and also provides it to the supervisor. When the supervisor provides his authorization, the node 40 transferes the data to public storage unit 46 and further transmits it to node 50. According to an additional aspect of the invention, node 40 operates as a "Store-and-Forward" buffer whereby at any point in time, it is either in communication with the public network 6 or with the secured network 8, but not to both networks. This means that the communication controller 48 provides communication with the secured network 8 only when the computer 41, disconnects from the public network 6. According to this aspect of the invention, there can be no on-line communication between the public network 6 and secured network 8, via node 40.

Figure 5:
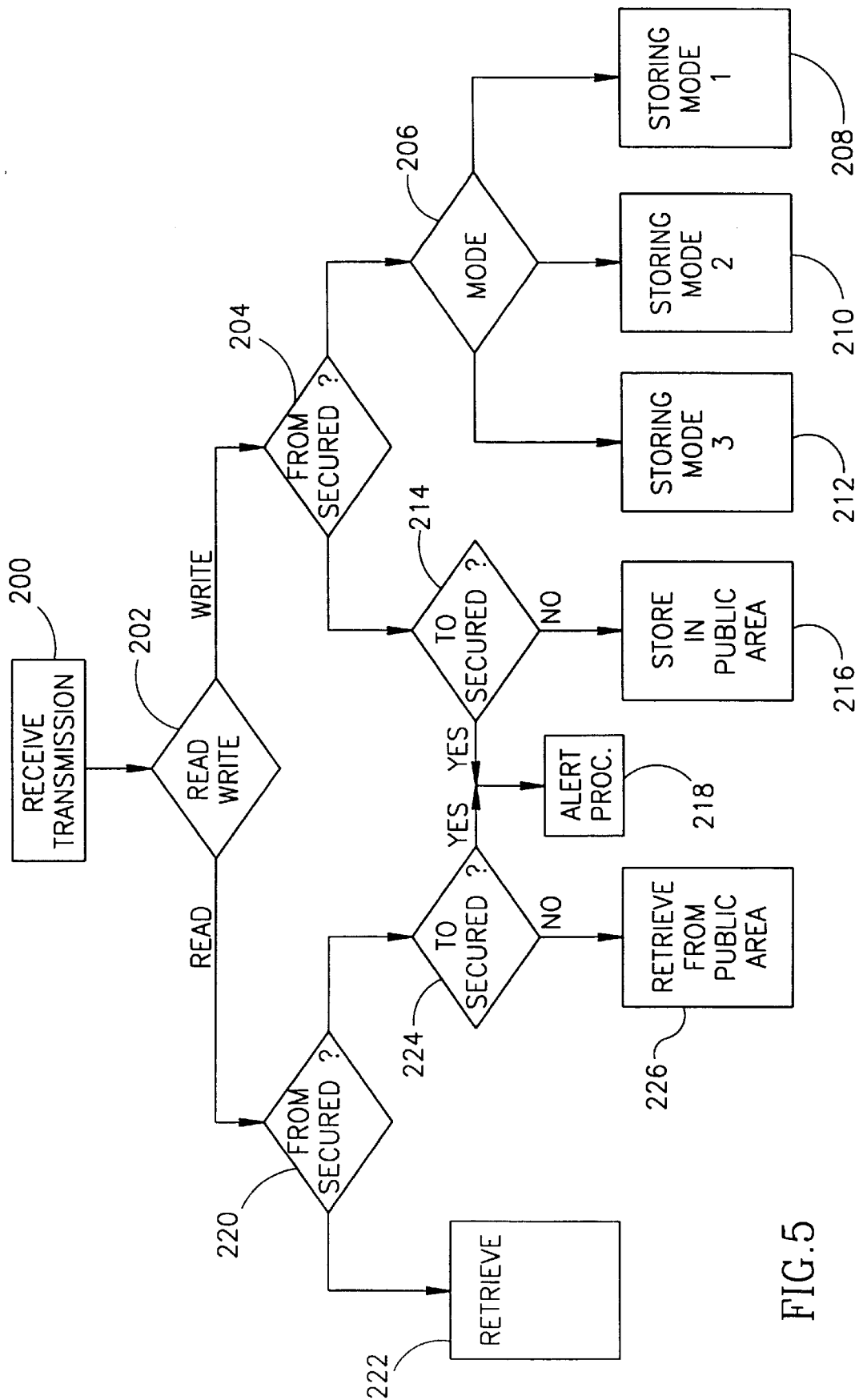
FIG. 5 is a schematic diagram of a method for operating a communication controller so as to provide limited communication access to a computer, operative in accordance with another preferred embodiment of the invention.

Reference in now made to FIG. 5 which is a schematic diagram of a method for operating a communication controller so as to provide limited communication access to a computer, operative in accordance with another preferred embodiment of the invention.

In step 200, the communication controller receives a transmission.

In step 202, the communication controller determines the type of request contained in the received transmission. If the received transmission contains a write access request, such as alter data, format, delete, move, copy and the like, then the controller proceeds to step 204. If the received transmission contains a read access request, then the controller proceeds to step 220.

In step 204, the communication controller determines if at least a portion of the transmission was received via the secured network. If so, then the communication controller proceeds to step 206. Otherwise, the communication controller proceeds to step 214.

In step 206, the communication controller determines a storing mode, as described hereinabove, according to which the transmission will be stored and proceeds to a respective step 208, 210 and 212.

In step 214, the communication controller determines if the requested destination of the transmission is the secured area. If so, then the communication controller proceeds to step 218. Otherwise, the communication controller proceeds to step 216.

In step 216, the communication controller stores the transmission in the public storage area.

In step 218, the communication controller executes an alert procedure. Such an alert procedure can be denying access to the secured area, producing an alert message or signal to the user operating the computer connected to the communication controller, halting selected activities in the node including the communication controller, and the like.

For reading, the communication controller determines (in step 220) if at least a portion of the transmission was received via the secured network. If so, then the communication controller proceeds to step 222. Otherwise, the communication controller proceeds to step 224.

In step 222, the communication controller retrieves data, according to the access request contained in the transmission.

In step 224, the communication controller determines if the requested destination of the transmission is the secured area. If so, then the communication controller proceeds to step 218. Otherwise, the communication controller proceeds to step 226.

In step 226, the communication controller retrieves data, from the public storage area, according to the access request contained in the transmission.

Figure 6:
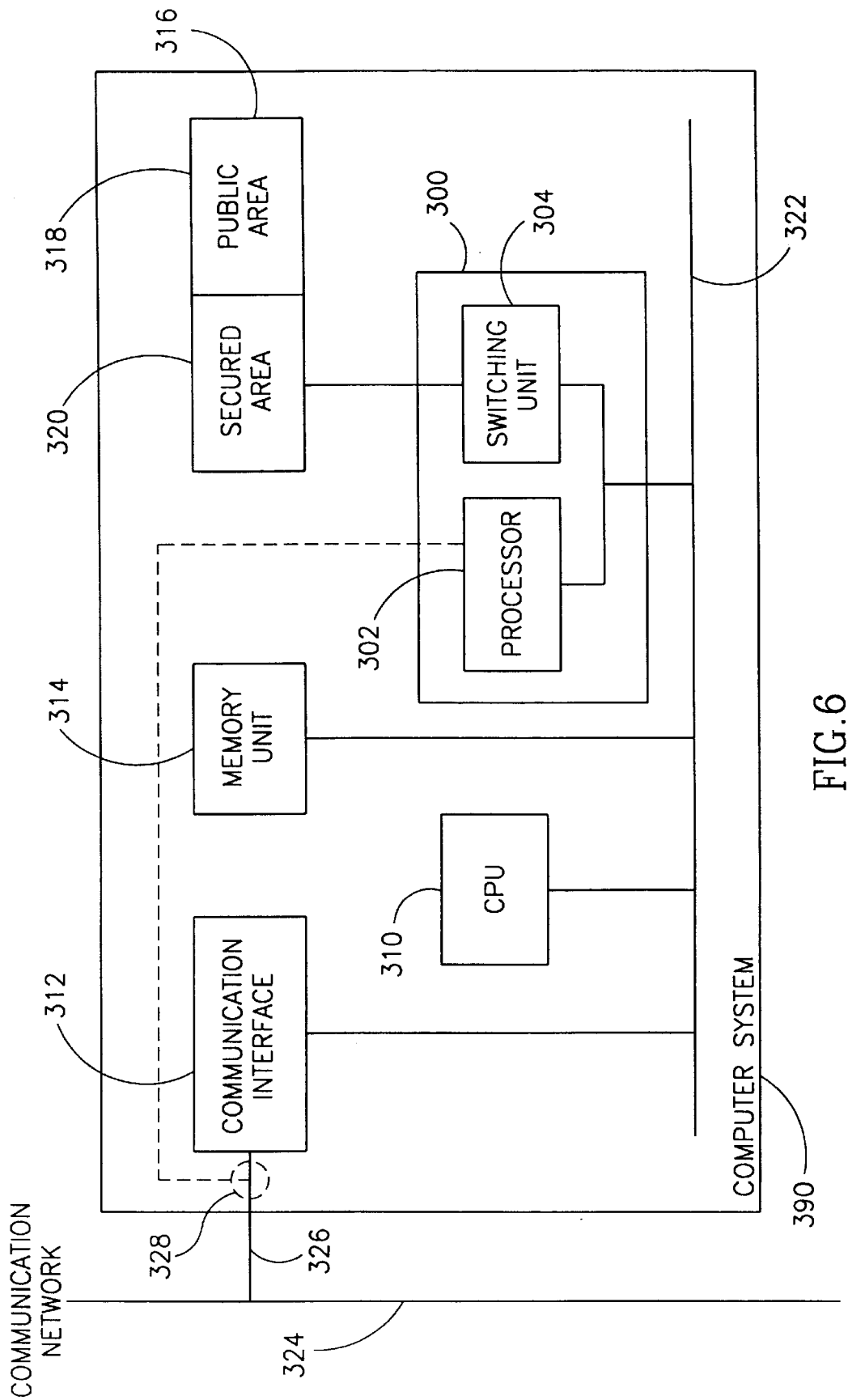
FIG. 6 which is a schematic illustration of a computer system and a device for securing the computer system during communication, constructed and operative in accordance with a further preferred embodiment of the invention.

Reference is now made to FIG. 6 which is a schematic illustration of a computer system, referenced 390, and a device, referenced 300, for securing the computer system during communication, constructed and operative in accordance with a further preferred embodiment of the invention.

Computer system 390 includes a Central Processing Unit (CPU) 310, a memory unit 314, a storage unit 316, a communication interface 312 for connecting to a communication network 324 and a communication bus 322. The device 300 according to the invention includes a processor 302 and a switching unit 304 connected thereto.

The storage unit 316 is divided into two areas, a public area 318 and a secured area 320. The device 300 controls the storage unit 316 so as to provide full access to the public area 318 via communication bus 322, to all of the components of the computer system 390 such as the CPU 310 and the communication interface 312.

The processor 302 controls the switch 304 so as to allow or deny access to the secured area 320. According to one aspect of the invention, the device 300 provides analysis management during and right after communication. Denying access to the secured area 320 can be implemented in several manners which include denying full access, providing read only access and the like.

According to the invention, during on-line communication with the network 324, the device 300 disconnects the secured area 320 from the computer system and denies all access to it. In addition, the processor 302 monitors all data transfer on communication bus 322, detects data changes in the public area 318 of storage unit 316 and generates a log file therefrom.

When the computer system 390 is disconnected from the network 324, the processor 302 retrieves an analysis software application from the secured area, generates a security key and provides the security key to the analysis software. In the present example, the analysis software application is an anti-virus scanning software. Then, the processor 302 provides the analysis software application to the CPU 310. The CPU 310 executes the analysis software application according to the log file on all of the data changes in the public area 318.

If the analysis software application does not detect any hostile software or in that matter, any suspicious data change, it returns the security key to the processor 302. Then, the processor 302 operates switching unit 304 so as to enable access to the secured area 320.

The device 300 is operative to deny access to the secured area 320 according to several method and parameters. According to one aspect of the invention, the secured area 320 is defined physically according to address. Thus, access is denied to selected addresses and provided to all the rest. A processor for this implementation may consist of a few logical NAND gates which automatically deny access to the secured area addresses.

According to another aspect of the invention, the secured area 320 is defined according to logical address, such as file name, directory name, logical attributes, and the like, to which access is denied.

Detection of an on-line communication situation is possible in several methods. According to one method, detection is provided via a direct connection to the communication line via a dedicated communication interface, as described in conjunction with communication controller 28 of FIG. 3, thus monitoring all activity therein. Alternatively, the device 300 is indirectly connected to the communication line, for example, by sensing the electromagnetic field produced in the vicinity of the communication cable, as indicated by reference 328, thus monitoring all activity therein. Further, either the computer system 390 or the communication interface provide information relating to the communication status to the device 300. Still further, a designated software application, such as a communication software provides information relating to the communication status to the device 300.

Figure 7:
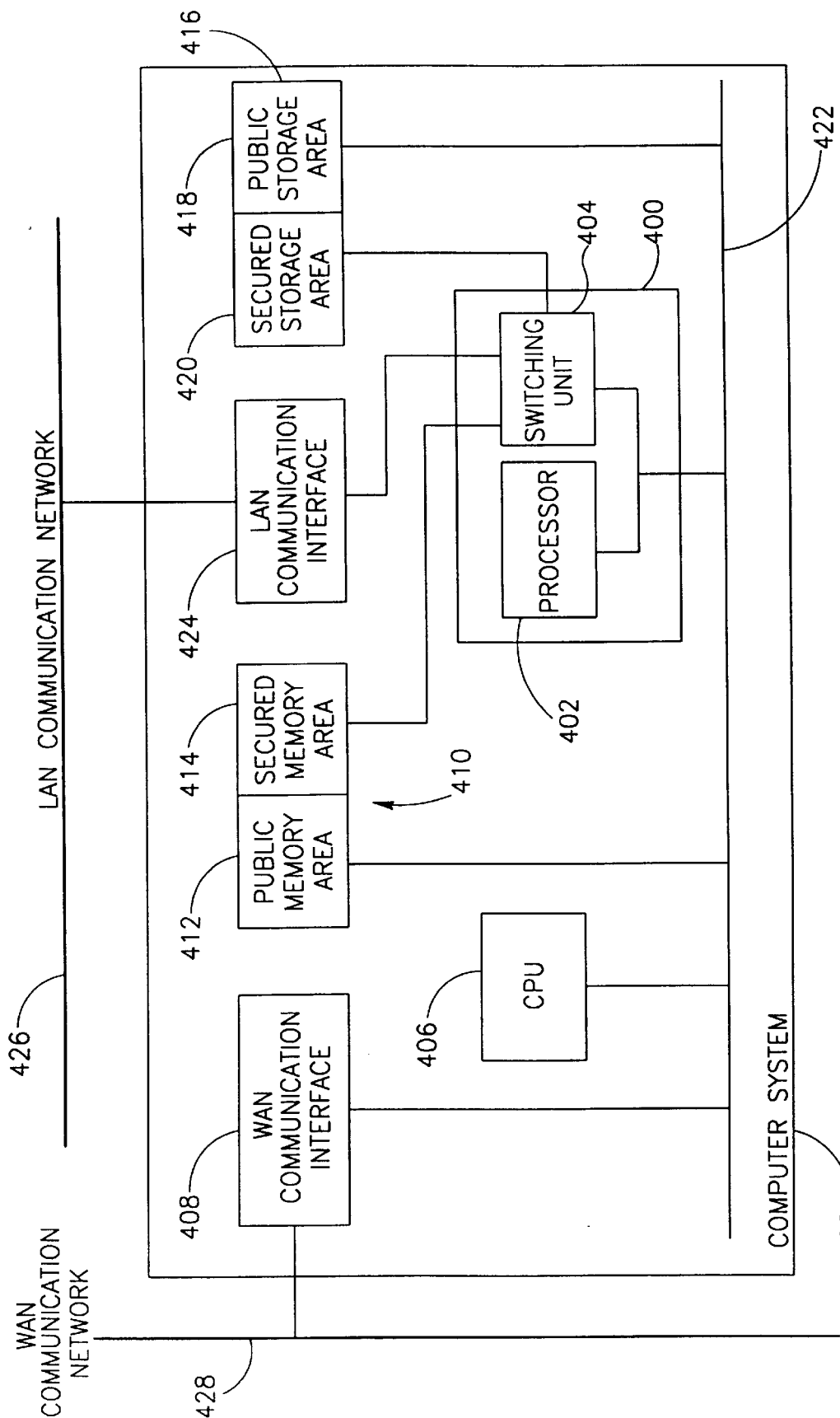
FIG. 7 is a schematic illustration of a computer system and a device for securing the computer system and its environment during communication, constructed and operative in accordance with yet a further preferred embodiment of the invention.

Reference is now made to FIG. 7 which is a schematic illustration of a computer system, referenced 490 and a device, referenced 400, for securing the computer system and its environment during communication, constructed and operative in accordance with yet a further preferred embodiment of the invention.

Computer system 490 includes a Central processing unit (CPU) 406, a memory unit 410, a storage unit 416, a WAN communication interface 408 for connecting to a WAN communication network 428 a LAN communication interface 424 for connecting to a LAN communication network 426 and a communication bus 422. The device 400 includes a processor 402 and a switching unit 404 connected thereto. It will be appreciated that this is a non-limiting example and that each of communication networks 428 and 424 can be any type of network such as a WAN, a LAN, a wireless communication network, an optical based network and the like.

The storage unit 416 is divided into two areas, a public storage area 418 and a secured storage area 420. The memory unit 410 is divided into two areas, a public memory area 412 and a secured memory area 414. According to one aspect of the invention, the two storage areas 418 and 420 can be a single storage unit which is divided into two parts, which is fully controlled by the device 400.

According to another aspect of the invention, the two storage areas 418 and 420 are two separate storage units which are not interconnected, whereas the device 400 fully controls the access to the secured storage area 418 and is adapted to perform an analysis procedure on the public storage area 420.

According to a further aspect of the invention, each of the storage areas 418 and 420 includes several storage units.

The public storage area 418, the public memory area 412, the CPU 406, the WAN communication interface 408 and the device 400 are interconnected via the communication bus 422.

The secured storage area 420, the secured memory area 414 and the LAN communication interface 424 are connected to the switching unit 404.

The processor 402 controls the switching unit 404 so as to allow or deny access to the secured storage area 420, the secured memory area 414 and the LAN communication interface 424. Access is denied when the computer system 490 is in communication with the WAN network via the WAN communication interface 408.

The device 400 operates generally similar to device 300. The device 400 is thus operative according to the method described hereinbelow with respect to FIG. 9 whereas, as long as a security flag, determined in this method, is on, access is denied to the secured storage area 420, the secured memory area 414 and the LAN communication interface 424.

According to a further aspect of the invention, the processor 402 is operative to execute an analysis software application in the secured memory area 414, which scans the public memory area 412 and the public storage area 418 after WAN communication is disconnected. Thus, the analysis software application is never accessible to unauthorized elements such as hostile programs or outside users.

According to the present invention, the device 400 can deny access to any device connected thereto, during communication, so as to prevent unauthorized access.

Figure 8:
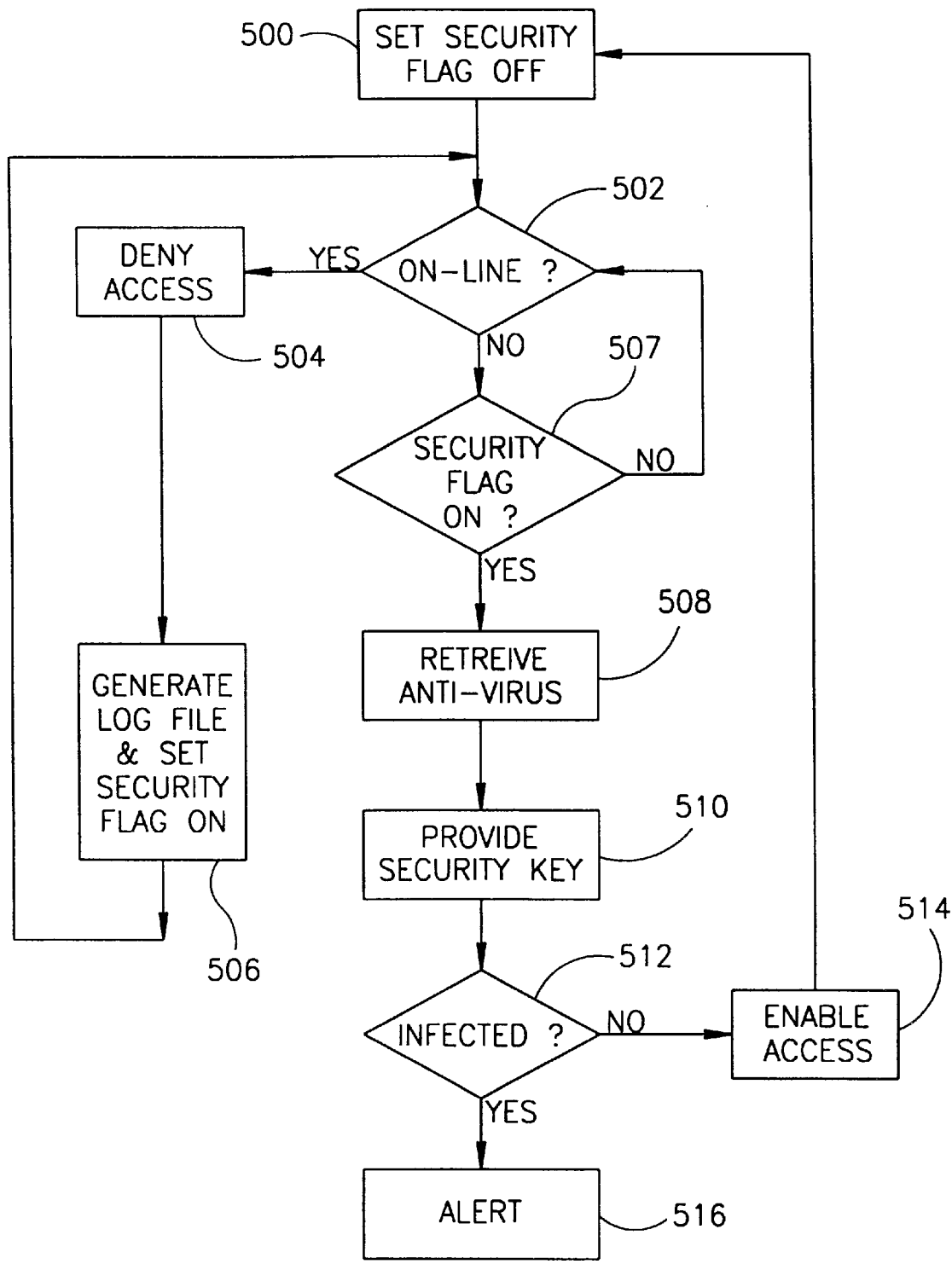
FIG. 8 is a schematic illustration of a method for operating communication controllers shown in FIGS. 1, 6 and 7, operative in accordance with a further preferred embodiment of the invention.

Reference is now made to FIG. 8 which is a schematic illustration of a method for operating devices 28, 38, 48 (FIG. 1), 300 (FIG. 6) and 400 (FIG. 7), operative in accordance with a further preferred embodiment of the invention. In the present example, the description refers to device 300 and computer system 390 of FIG. 6. The method includes the following steps:

In step 500, the device sets a security flag to off.

In step 502, the device 300 detects if the computer 390 performs on-line communication. If so, the device proceeds to step 504. Otherwise, the device proceeds to step 507. Off-line communication is defined either when the communication interface (for example, the modem) is disconnected from the network, or when the computer is disconnected from the communication interface, either temporarily, or permanently, while communication interface stays connected and communicating with the network.

in step 504, the device 300 disconnects the secured area 318 from the rest of the computer system 390.

In step 506, the device 300 turns the security flag on and generates a log file of the data changes which occur in the computer system 390 and its public storage area, during communication, due to incoming data and the like. At the same time, the device proceeds back to step 502 for confirming that communication is on-line.

In step 507, if the security flag is on, then the device proceeds to step 508. Otherwise the device proceeds back to step 502.

In step 508, the device 300 generates a security key and proceeds to step 510.

In step 510, the device 300 retrieves an analysis software application from the secured area, provides the security key to the analysis software application and provides them both to the CPU 310.

In step 512, the CPU executes the analysis software application, on all data changes which, according to the log file, occurred during on-line communication. The analysis software application detects if any hostile attempt was made to damage the information contained therein. If so, the computer system 390 proceeds to step 516. Otherwise, the system 390 proceeds to step 514.

In step 514, the analysis software application returns the security key to the processor 302, which in turn enables access to the secured area 320 and proceeds back to step 500.

In step 516, the computer system 390 provides the user with a warning and halts.

The security key is preferably generated according to a momentary data situation in the secured area 320. The security key can also be generated as a one time key which is independent of the secured area 320, such as according to an internal random generator and the like. The main reason for this it to minimize and preferably eliminate all possible access to this security key from elements which are not authorized and which may attempt to try to provide this key to the processor 302.

Figure 9:
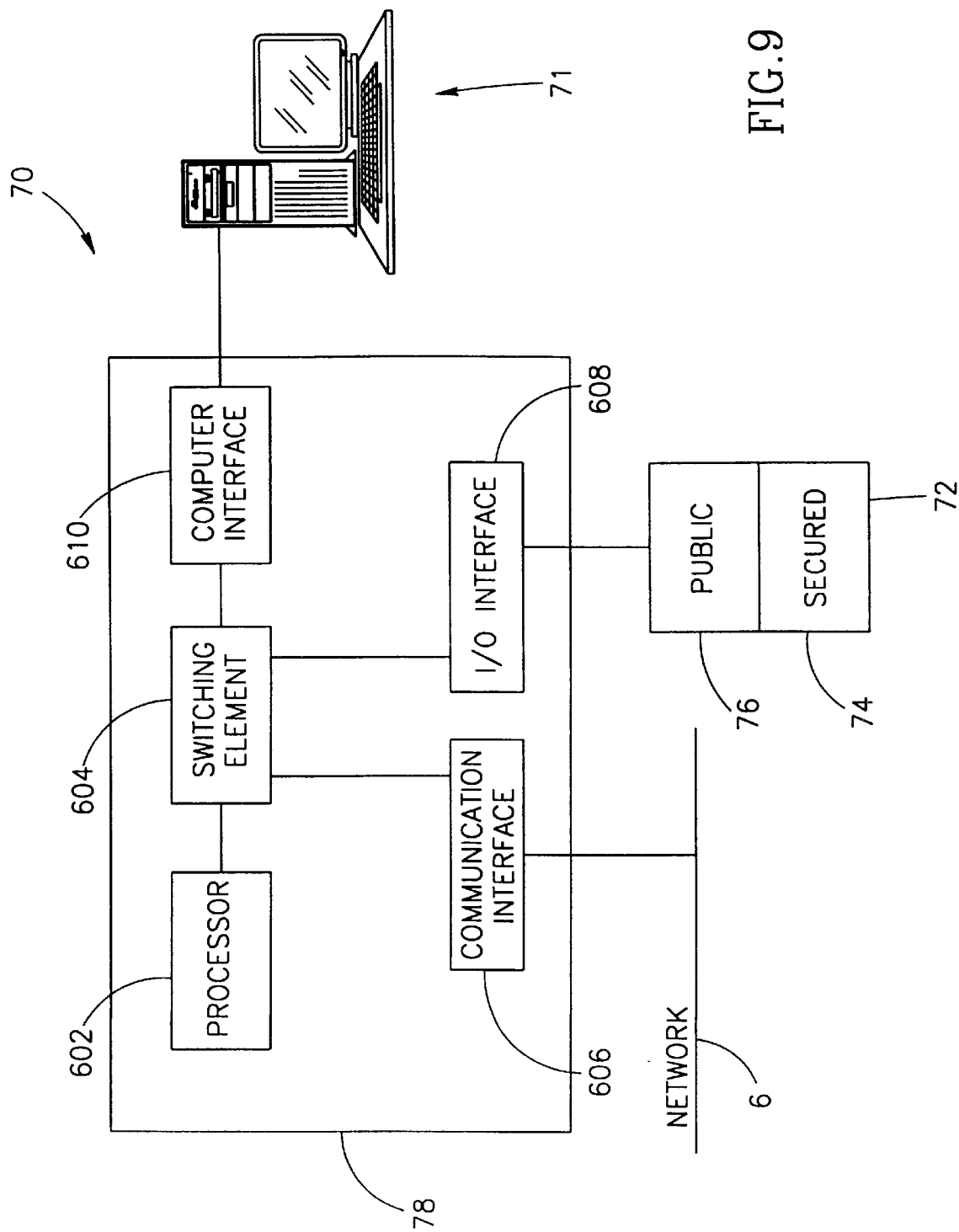
FIG. 9 is a schematic illustration in detail of a further node, shown in FIG. 1.

Reference is now made to FIG. 9 which is a schematic illustration in detail of node 70 of FIG. 1.

The communication controller 78 according to the invention includes a processor 602, a switching unit 604, a communication interface 606, an input-output (I/O) interface 608, a computer interface 610. Communication controller 78 is connected to a network 6 via the communication interface 606, to storage unit 72 via I/O interface 608 and to the computer system 71 via computer interface 610. The storage unit 72 is divided into two major sections, a public section 76 and a secured section 74. According to the present example, I/O interface is either an IDE-ATA or SCSI disk controller.

The communication interface 606 is selected according to the type of network 6 and is selected from the group consisting of a dial-up modem, a WAN modem, a LAN modem, an optical modem, an ISDN modem, a cable television modem, and the like. The communication interface 606 may also be an I/O interface for connecting to a modem of any kind. The processor 602 controls the on-line physical connection of the computer station, the storage unit 72 and the network 6, therebetween.

The communication controller 78 is operative according to several modes of operation. According to one mode of operation, the communication controller 78, when receiving a communication request command from the computer system 71, operates the communication interface 606, so as to provide communication with network 6. At the same time, the communication controller 78 monitors all access requests to the storage unit 72, allows access to the public area 76 and denies access to the secured area.

According to a second mode of operation, when the computer system 71 provides the communication controller with a request to access the secured area 74, the communication controller 78 operates the switching unit 604 so as to disconnect the computer from the communication interface 606, while maintaining communication between the communication interface 606 and the network 6.

At that point, the processor 602 scans the public area 76 as well as any other storage unit in computer system 71 so as to detect harmful programs which may cause damage to the secured area. If such programs are not detected, the communication controller provides the computer system 71 with access to the secured area 74. When the computer system provides the communication controller 78 with a command to reconnect to the network, the communication controller 78 reconnects the computer system 78 with the communication interface 606 and simultaneously denies all access to the secured area 74.

According to a third mode of operation, the communication controller 78 terminates the communication with network 6 and the processor 602 scans the public area 76 as well as any other storage unit in computer system 71 so as to detect harmful programs which may cause damage to the secured area. If such programs are not detected, the communication controller provides the computer system 71 with access to the secured area 74.

It will be appreciated that the processor 602 can either scan or execute a scanning and analyzing software which is designed for this purpose. According to the present invention, the method described in FIG. 8, can be implemented in communication device 78.

It is noted that the processor 602, by controlling switching element 604 and communication interface 606, can disconnect the computer 71 from the network either by providing communication interface 606 with a command to terminate communication with network 6 or by operating switching element 604 so as to disconnect communication interface 606 from the computer 71 while maintaining the connection between the communication interface 606 and the network 6.

According to the invention, the processor 602 is also operative to receive, from the computer 71, commands to disconnect communication between the communication interface 606 and the network 6 or between the communication interface 606 and the switching element 604.

Figure 10:
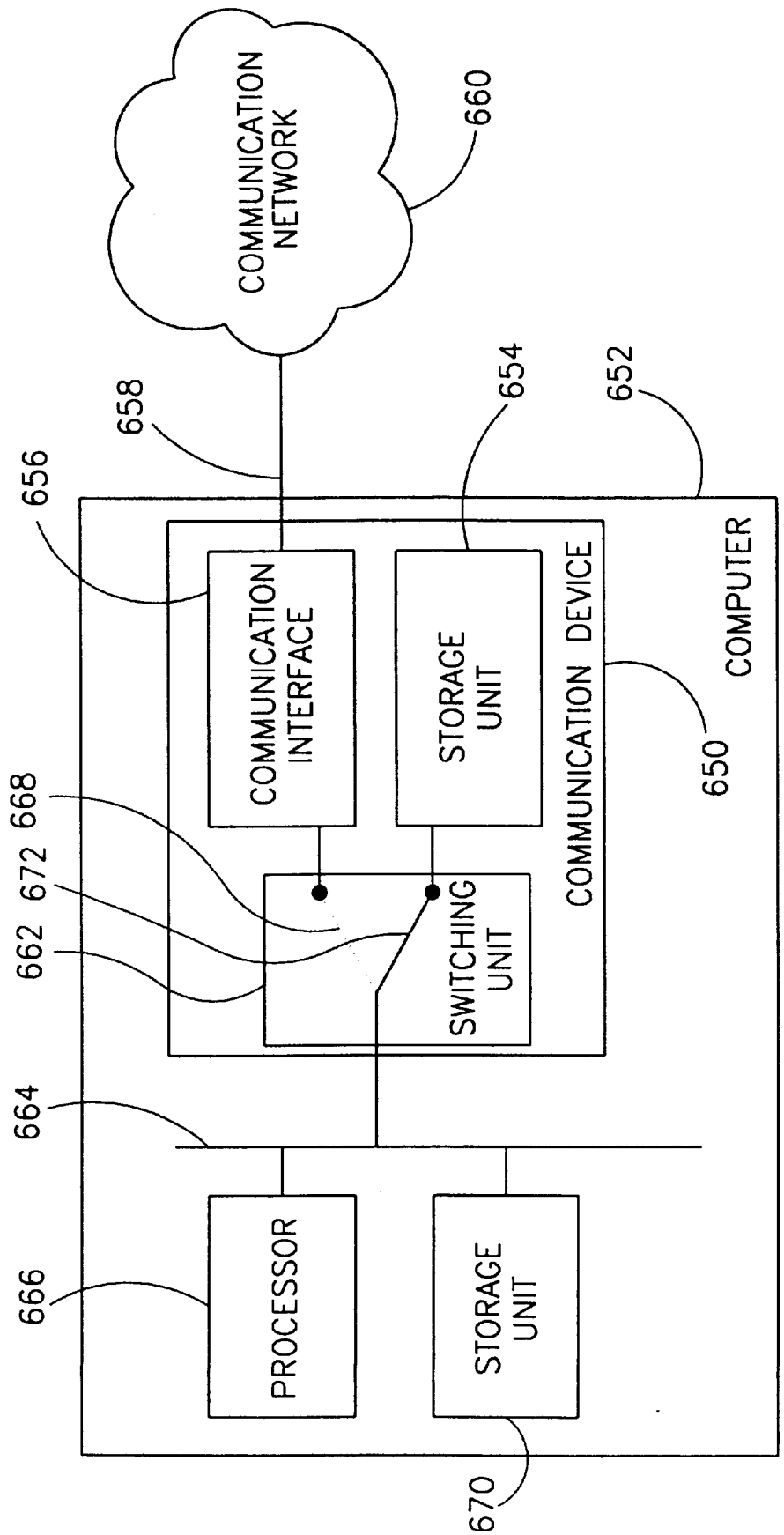
FIG. 10 is a schematic illustration of a computer station and a communication device, constructed and operative in accordance with a preferred embodiment of the invention.

Reference is now made to FIG. 10 which is a schematic illustration of a computer station and a communication device, generally references 650, constructed and operative in accordance with a preferred embodiment of the invention.

Device 650 includes a communication interface 656, a storage unit 654 and a switching unit 662. Communication interface 656 is connected to switching unit 662 and to a communication line 658, which is further connected to a communication network 660. Device 650 is connected to a data bus of a computer 652 which further includes a processor 666 and a storage unit 670.

Communication interface 656 can be a conventional modem, a modem emulator, a network communication card, and the like. Storage unit 654 can be any type of data storage device such as ROM, RAM, flash memory, a disk, tape and the like. Some implementations of the invention such as the first one, require dynamic read\write storage units such as RAM, flash memory, a disk and the like, since the data stored in the secured storage unit is dynamic. Other implementations such as the second and third ones can use less dynamic storage units such as ROM, EPROM, EEPROM and the like, which are likely to simplify the overall structure and reduce the cost of manufacturing the device 650.

The device 650 is operative according to several modes, which enhance the security of confidential information against unauthorized access attempts from the network 110. Disclosed hereinafter are a number of non-restricting, exemplary modes.

According to a first mode, any confidential data file which needs to be secured is divided into two segments. The first segment is stored in the storage unit 670 of computer 652 and the second segment is stored in storage unit 654 of device 650. The division is performed so that reconstructing the original file using the first segment alone is likely to be extremely difficult which, in practice, may be considered impossible.

According to another mode, confidential data contained in storage unit 670 is encrypted using an exclusive encryption key, wherein when the encryption is complete, the key is stored in storage unit 654.

According to a further mode, all of the confidential data is stored in storage unit 654.

The computer 652 is able to communicate with the network via the communication interface 656, as indicated by the dotted line 668. When the computer 652 does not communicate with the network 660, the switching unit 662 disconnects the bus 664 from the communication interface 656 and connects the storage unit 654 to the bus 664, as indicated by line 672.

When the computer establishes a communication connection via communication interface 656, switching unit 662 disconnects storage unit 654 from the bus 664 and connects the communication interface 656 to the bus 664. Thus, any party communicating with the computer 652 has limited data access which is confined to the data stored in the computer storage unit 670 and not to the data contained in storage unit 654.

It will be appreciated that when the switching unit 662 disconnects the storage unit 654 from the bus 664 it makes the storage unit and all of the data contained therein unavailable.

The communication device 650 can be implemented as an add-on internal card according to conventional standards such as an AISA, VLB, PCI, PCMCIA and the like. The device can also be implemented as an external device for connecting via a serial port, a parallel port and the like. Thus, for example, the device 650 can be implemented as PCM-CIA modem card for a portable computer. The user can remove the communication device from the computer 654 and use it as a key. It will be appreciated that as long as the communication device 650 is not connected to the computer 652, there is no access to any data contained inside storage unit 654.

According to the present invention, the method described in FIG. 8 can be implemented in communication device 650.

Figure 11:
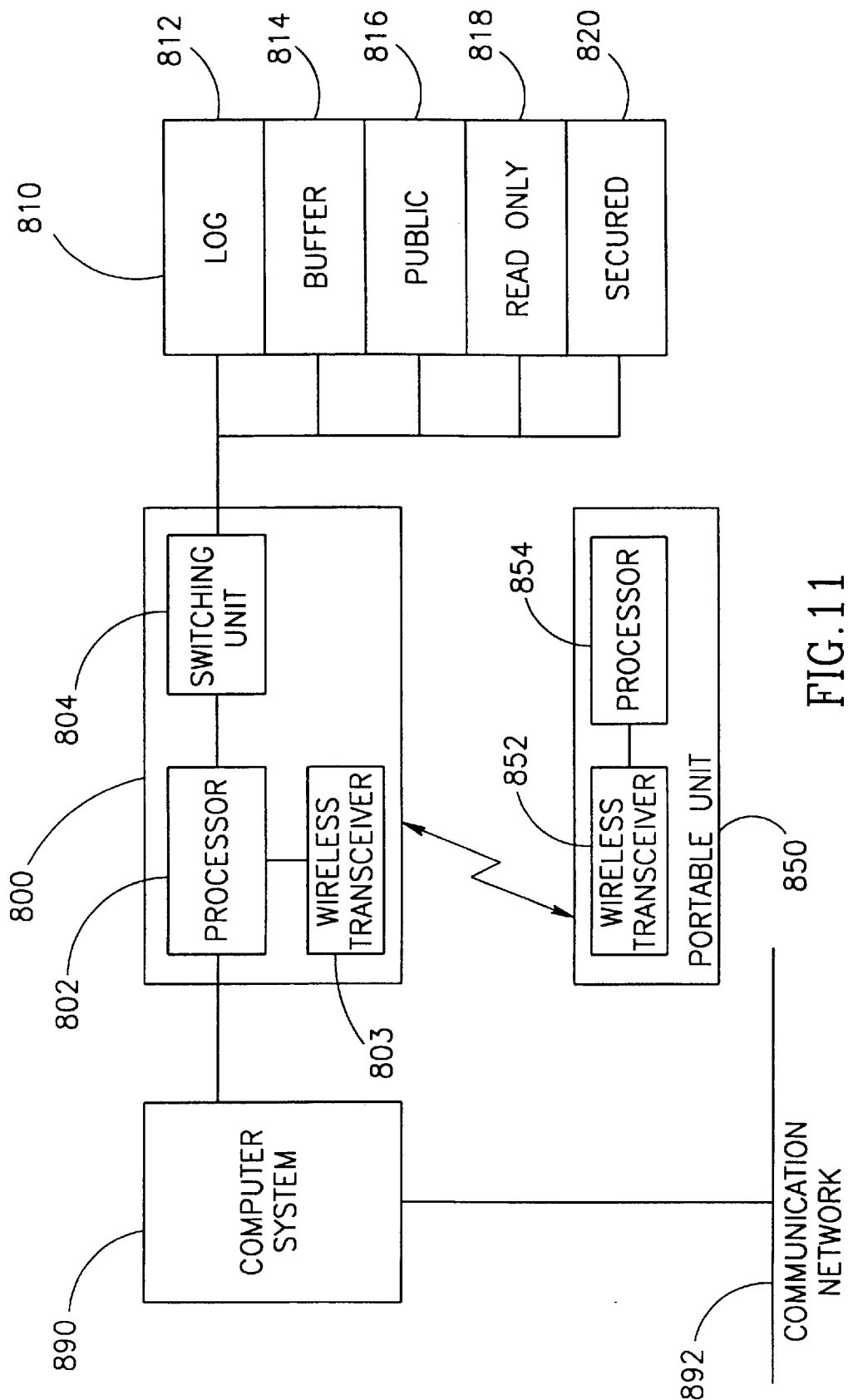
FIG. 11 is a schematic illustration of a computer system, a storage unit, a communication device and a portable unit, for securing the computer system during communication, constructed and operative in accordance with yet another preferred embodiment of the invention.

Reference is now made to FIG. 11 which is a schematic illustration of a computer system, referenced 890, a storage unit, referenced 810 a device, referenced 800 and a portable unit 850, for securing the computer system during communication, constructed and operative in accordance with yet another preferred embodiment of the invention.

The computer system 890 is connected to a communication network 892 and to the device of the invention 800. The device 800 is also connected to storage unit 810. The device 800 includes a processor 802, a switching unit 804 and a wireless transceiver 803.

The portable unit 850 includes a wireless transceiver 852 and a processor 854, connected thereto.

The storage unit 810 is divided into five areas:

a log area 812, for managing a log file;

a buffer area 814, for intermediately storing data upon receipt but before it is transferred into a secured area 820;

a public area 816, which is accessible at all times;

a read only area 818, for storing operating unit files, analysis software application and the like; and a secured area 820 for storing confidential information.

The device 800 manages the storage unit 810 as follows. When the computer system 890 is in an on-line communication with the communication network 892, the device 800 enables full access to the public area 816 and to the buffer area 814, for reading and writing. The device 800 also enables limited read-only access to the read only area 818. Simultaneously, the device 800 updates the log area with information relating to data changes in the storage unit 810 and data requests received from the computer system 890. The device 800 denies access to the secured area 820. After the computer system 890 is disconnected from the communication network 892, the device 800 retrieves an analysis software application from the read only unit and executes it, according to the information contained in the log area 812, on the data contained in the public area 816 and the buffer area 814. Any data which is destined for the secured area 820 is transferred from the public area 816 to the buffering area 814, scanned and, if classified as harmless, transferred to the secured area 820.

According to the present embodiment, the device 800 is operable to provide access secured areas in the storage unit 810 only when an authorized user, wearing the portable unit 850, is in the vicinity of the device 800.

According to a wireless mode of the invention, the wireless transceiver 852 transmits a signal to the wireless transceiver 803. The wireless transceiver 803 detects this signal and provides it to the processor 802 which regard it as an enable signal to provide access to the secured areas in storage unit 810. According to this mode, if the user has left the premises and wireless transceiver 803 does not detect the signal transmitted by the wireless transceiver 852, the device 800 denies access to the secured areas of the storage unit 810.

According to another wireless mode, the processor 854 provides the wireless transceiver 852 commands to transmit a different signal from time to time. The processor 802 is then adapted to recognize the various signals or the change between them.

According to a further wireless mode, wireless transceiver 803 and wireless transceiver 852 communicate using bidirectional communication. Thus, the processors 802 and 854 are operative to exchange decoded signals, so as to enhance even more the level of security.

Figure 12:
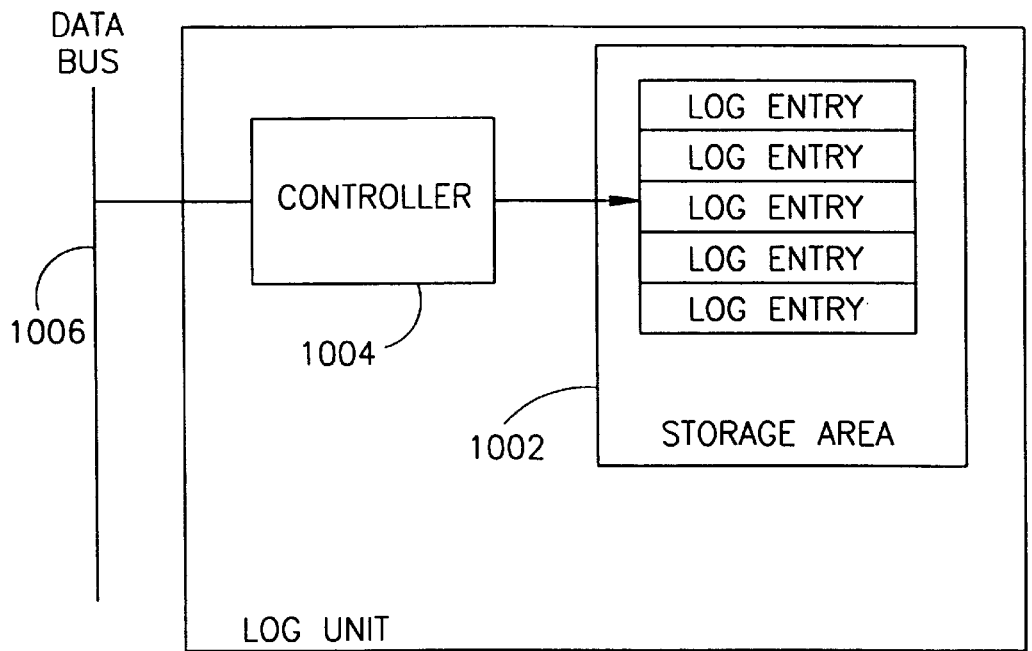
FIG. 12 is a schematic illustration of a log unit, constructed and operative in accordance with yet another preferred embodiment of the invention.

Reference is now made to FIG. 12 which is a schematic illustration of a log unit, referenced 1000, constructed and operative in accordance with yet another preferred embodiment of the invention.

The log unit 1000 includes a storage area 1002 and a controller 1004 connected thereto. The controller 1004 is operative to provide sequential writing of log entries in the storage unit as well as random-access reading of log entries contained therein.

According to the invention, when the controller 1004 receives a write-command to register a new log entry, it ignores the address which may by incorporated in the write-command and assign an address which is in sequence with the address of the previous write-command. Thus, an attempt to change a preselected log entry with a write-command which includes a specific address will not be executed. According to one aspect of the invention, when such an attempt occurs, the controller 1004 produces an alert command to a computer (not shown) connected thereto.

One of the main advantages of this log unit is that it does not permit free writing access to the log area, thus preventing any deliberate change of a preselected log entry.

When a log file is located in a finite size storage area, sometimes it exceeds the limit of storage space. The common solution in this situation is to define the log file as a cyclic file, i.e. after writing the last possible entry, at the end of the log file, then start writing at the beginning of the log file. Thus, if one wishes to change the log file, he may write as many log entries needed to fill and rewrite the entire log file.

The method according to the invention, overcomes this problem by providing a minimum time period between two sequential log entry write commands. Thus, writing over an entire log file is limited so that one cannot be performed it in a short period of time.

Figure 13:
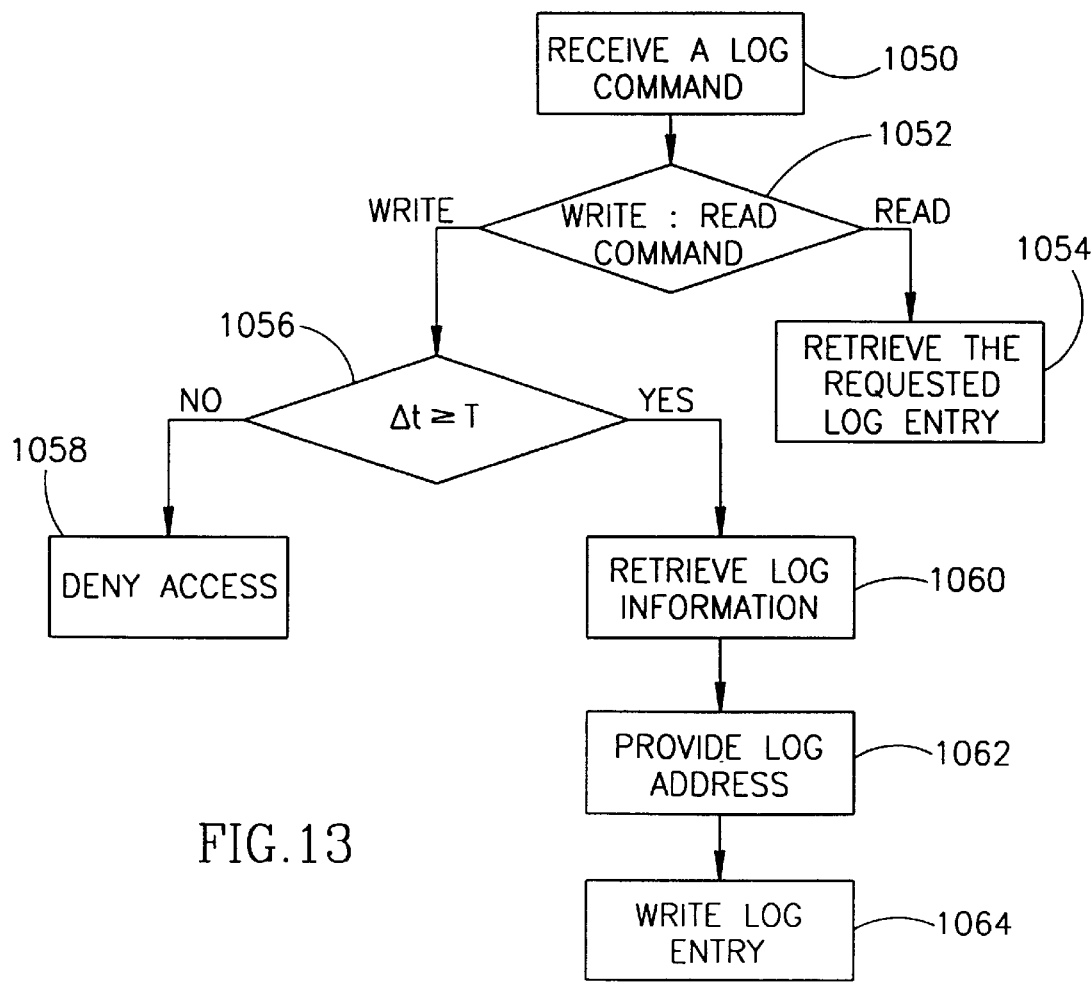
FIG. 13 is a schematic illustration of a method for operating the log unit of FIG. 12, operative in accordance with yet a further preferred embodiment of the invention.

Reference is now made to FIG. 13 which is a schematic illustration of a method for operating the log unit 1000 of FIG. 12, operative in accordance with yet a further preferred embodiment of the invention.

In step 1050, the log unit 1000 receives a log command.

In step 1052, if the received log command is a write command, then the log unit 1000 proceeds to step 1056. Otherwise, if the received log command is a read command the log unit 1000 proceed to step 1054.

In step 1054, the log unit 1000 retrieves a requested log entry.

In step 1056, if the time period α is greater than or equal to a predetermined period of time T, then the controller 1004 proceed to step 1060. Otherwise, the controller 1004 proceeds to step 1058.

In step 1058, the controller 1004 denies access to the to the storage area 1002.

In step 1060, the controller 1004, retrieves the log information from the log command and proceeds to step 1062.

In step 1062, the controller 1004 provides a log address which is in sequence with the address of the previous write-command.

In step 1064, the controller 1004 writes a log entry containing the log information at the log address.

According to a further aspect of the invention, step 1058 may also include producing an alarm signal to alert a supervisor, and the like.

It will be appreciated by persons skilled in the art that the present invention is not limited to what has been particularly shown and described hereinabove. Rather the scope of the present invention is defined only by the claims which follow.

We claim

1. A device for protecting secured areas in a computer system, the device comprising:

a communication interface for connecting to a network;

a secured device interface for connecting to a secured area;

a managing controller connected to said communication interface and between said secured device interface and said computer system, wherein said managing controller detects independently of a request message by a user of said computer system whether said communication between said computer system and said network is in progress, wherein said managing controller connects said computer system with said secured device interface whether said communication is not in progress, and wherein said managing controller disconnects said computer system from said secured device interface whether said communication is in progress.

2. A device according to claim 1 wherein said secured device interface is selected from the group consisting of:

a communication interface;

an input-output data interface;

a human interface; and an electromechanical device interface.

3. A device according to claim 1 wherein said secured device interface includes a modem.

4. A device according to claim 1 wherein said secured device interface includes an input-output data interface and wherein said device further comprises a storage unit connected to said input-output data interface, said storage unit storing secured information.

5. A device according to claim 4 wherein said storage unit is selected from the group consisting of:

a random access memory;

a read only memory;

a hard disk drive;

an EPROM;

an EEPROM;

a FLASH memory unit;

an optical storage unit; and an electro-optical storage unit.

6. A device according to claim 1 further comprising:

a first wireless transceiver connected to said managing controller; and a remote unit, said remote unit comprising a second transceiver and a processor, connected thereto, said processor controlling said second transceiver, said first transceiver enabling said managing controller to connect said computer station with said secured area interface when detecting a predetermined transmission, said remote unit transmitting said predetermined signal via said second transceiver.

7. A method for protecting a secured area in a computer system which is connected to a network, the computer system including a secured area, the method comprising the steps of:

A. detecting independently of a request message by a user of said computer system the communication status between said computer system and said network, if said communication status is on-line, proceeding to step B, otherwise enabling access to said secured area, B. monitoring all incoming data access requests and detecting if access is requested to said secured area, if so, proceeding to step C, otherwise proceeding to step D;

C. executing an alert procedure;

D. detecting independently of a request message by a user of said computer system the communication status between said computer system and said network, if on-line, proceeding back to step B, otherwise proceeding to step E; and E. proceeding back to step A.

8. A method according to claim 7 wherein said alert procedure is selected from the group consisting of:

denying access to said secured area;

providing an alert signal to a user operating said computer system; and providing access to an alternative area.

9. A method for protecting a secured area in a computer system which is connected to a network, the computer system including a secured area and a public storage area, the method comprising the steps of:

A. detecting independently of a request message by user of said computer system the communication status between said computer system and said network, if on-line, proceeding to step B, otherwise enabling access to said secured area;

B. monitoring all incoming data access requests and detecting if access is requested to said secured area, if so, proceeding to step C, otherwise proceeding to step D;

C. executing an alert procedure;

D. detecting independently of a request message by user of said computer system the communication status between said computer system and said network, if on-line, proceeding back to step B, otherwise proceeding to step E;

E. analyzing data contained in said storage area so as to detect harmful software therein, if such harmful software is detected, proceeding to step F, otherwise enabling access to said secured area and proceeding to step A; and F. executing an alert software.

10. A method according to claim 9 wherein said step B further comprises generating at least one log entry representing said access request before proceeding to step D, and wherein said analyzing, in step E, is performed according to said at least one log entry.

11. A method according to claim 9 wherein said alert procedure is selected from the group consisting of:

halting selected activities said computer system;

denying access to said secured area;

providing an alert signal to a user operating said computer system; and providing access to an alternative area.

* * * * *